(12) United States Patent
Kull

(10) Patent No.: US 6,229,452 B1
(45) Date of Patent: May 8, 2001

(54) ECP TRAIN LINE COMMUNICATIONS FOR RAILWAY FREIGHT CAR BRAKES

(75) Inventor: Robert C. Kull, Olney, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/224,543

(22) Filed: Dec. 31, 1998

(51) Int. Cl.⁷ .................. G08B 23/02; B60T 7/12
(52) U.S. Cl. .................. 340/825.08; 340/933; 340/10.33; 340/10.34; 701/19; 246/1 C; 246/167 R; 303/128
(58) Field of Search .................. 340/825.08, 825.07, 340/10.1, 10.33, 10.34, 933; 701/19, 29, 30; 246/166, 167 R, 1 C; 303/127, 128

(56) References Cited

U.S. PATENT DOCUMENTS

| | | | |
|---|---|---|---|
| 4,344,238 | 8/1982 | Frasier | 701/70 |
| 5,064,251 | 11/1991 | Romansky | 303/3 |
| 5,681,015 | 10/1997 | Kull | 246/187 C |
| 5,856,788 * | 1/1999 | Walter et al. | 340/825.24 |
| 5,959,568 * | 9/1999 | Woolley | 340/825.54 |
| 5,984,427 * | 11/1999 | Kettle, Jr. | 303/16 |

* cited by examiner

Primary Examiner—Donnie L. Crosland
(74) Attorney, Agent, or Firm—Buchanan Ingersoll, P.C.

(57) ABSTRACT

A low power ECP trainline communication method is provided wherein power consumption by each freight car's on-board ECP transceiver is minimized such that it can be powered indefinitely by a standard locomotive battery. The low power communication method includes normally maintaining each car's ECP transceiver in a sleep mode until signaled by the locomotive master controller to wake it up. The wake-up command for the ECP transceiver can be sensitive to the length of the message sent by the MC. Alternative, or additional methods of identifying a wake-up message from the MC can include using the signal strength of the message and making the wake-up command sensitive to the ECP trainline power status. In the latter case, detection of zero trainline power is a signals to wake-up the ECP transceiver.

32 Claims, 2 Drawing Sheets

ECP TRAIN LINE COMMUNICATIONS FOR RAILWAY FREIGHT CAR BRAKES

BACKGROUND

Figure 1:
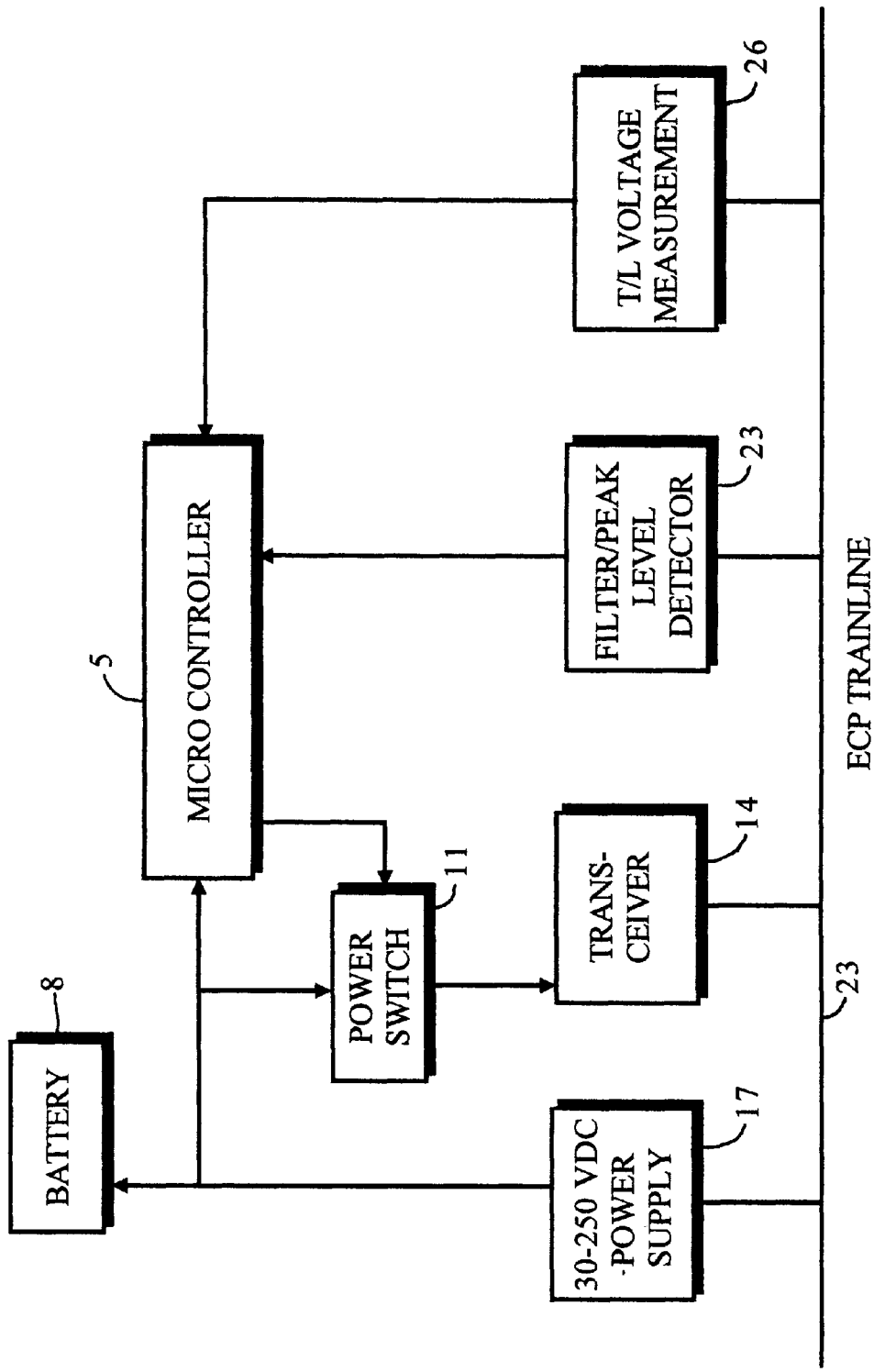

This invention relates generally to ECP freight train braking systems and, more particularly, to a method for implementing low power ECP trainline communications whereby power consumption is reduced to a level such that sufficient power can be provided by a standard locomotive battery to indefinitely power the ECP equipment on each car.

The AAR has defined rail industry specifications for Electrically Controlled Pneumatic (ECP) braking based upon use of Echelon LonWorks, PLT-10A power line overlay transceiver version, as the means to communicate between cars and the lead locomotive. The communication specifications, as presently defined, require the Echelon transceiver to be "on" at all times, in order to be ready to receive brake commands from the locomotive, as well as to respond to routine status polling requests.

The Echelon transceiver has a power demand of approximately 300 mW when in receive mode and 2.5 W when transmitting. Message lengths for transmissions are typically on the order of 20 ms long. The average car transmission duty cycle is on the order of two times per minute (except for the last car in the train, which transmits each second). Therefore, the average power demand associated with the Echelon transceiver is on the order of 320 mW.

The AAR specifications allow an average power budget of 10 W per car. To supply this level of power, it is necessary to provide a nominal 230 VDC trainline, for a 160-car train, with a 12,000-foot length. This has resulted in the need for a 74 to 230 VDC DC-DC power supply on a locomotive in the consist, with a power rating of 2,500 W, to provide sufficient ECP power for 160 cars and losses due to cable resistance.

A low-power ECP system emulation system with an average power requirement budget under 500 mW in "emulation" mode is disclosed in commonly owned copending U.S. patent application Ser. No. 09/224,540, titled "RAILWAY EMULATION BRAKE," filed on Dec. 31, 1998, and is hereby incorporated herein by reference. That system provides for powering an "all electric" ECP valve system using the 74 VDC from the locomotive, while emulating a conventional pneumatic service valve operation. The power budget for that system is based upon use of the Echelon transceiver only for system set-up and alarm reporting. It does not allow for the full ECP functionality of electrically activated brake application and graduated release of brakes. The addition of approximately 320 mW associated with having the Echelon continuously on for full ECP functionality cannot be afforded in a power budget low enough to operate on 74 VDC.

Additionally, commonly owned copending U.S. patent application Ser. No. 09/224,541, titled "RAILWAY LOCOMOTIVE ECP TRAINLINE CONTROL," filed on Dec. 31, 1998, is also hereby incorporated herein by reference.

In a very low power ECP trainline type of system the Echelon receiver cannot be powered all the time, as it is in a conventional system, since the Echelon receiver consumes too much power. Thus it is necessary to provide for a "Master Controller" ("MC") on the locomotive, i.e. the HEU, to tell each freight car in the train to turn its Echelon receiver "on" so that the MC can issue commands to the freight cars. Also, in a low power ECP system, since the communications device, i.e. the Echelon transceiver, is normally turned off, it is necessary to provide for each car to periodically report their status to the MC. Moreover, failure conditions need to be handled in a safe manner.

Accordingly, there is a need for a low power ECP communication system wherein the Echelon transceiver is operated on an intermittent basis, as needed to reduce the average power demand under 100 mW, while still providing full functionality, per AAR ECP specifications. Thus, a fully functional ECP system can be provided with the power supplied by the standard 74 VDC locomotive battery along with the safe management of failure conditions.

SUMMARY

A low power ECP trainline communication method is provided wherein power consumption by each freight car's on-board ECP transceiver, typically the Echelon transceiver, is minimized to a level where the system can be reliably and indefinitely powered by a standard, normally 74 VDC, locomotive battery. As a result, it is not necessary to always provide a 230 VDC trainline and all of the requisite associated electrical equipment in order to operate a train in an ECP environment. For versatility, the ECP freight cars can be equipped to operate in dual modes. Upon initial train start up, each ECP freight car can detect the prevailing ECP trainline power. If 100 to 230 VDC is detected, normal AAR standard ECP protocol with the associated higher power limits is implemented. However, if less than 100 VDC is detected, a low power ECP communications mode according to the invention is implemented. The low power communication method includes placing the Echelon transceiver in a sleep mode during normal operation and waking it up when desired. The locomotive MC can control a device, or circuitry, on each ECP freight car to put to sleep or wake up the Echelon transceiver. Control over waking up the Echelon transceiver can be instituted by making the wake-up command sensitive to the length of the message sent out by the MC. For example, routine status messages sent by the MC to each car are normally on the order of 20 ms. Therefore, the wake-up command can be made substantially longer, for example 50 ms. Similarly, a series of shorter messages spanning the 50 ms time period can also be used to issue the wake-up command. To return the Echelon is to sleep mode after it has been turned "on," the MC can issue a specific command to return the Echelon to sleep. Alternatively, if no message is received after a set time period, for example 2 minutes, the device, or circuitry, on the freight car can automatically return the Echelon to sleep. Additionally, the signal strength of the message sent by the MC can be utilized to identify the wake-up command. Another alternative for controlling the sleep/awake status of the Echelon transceiver is by also making the wake-up command sensitive to ECP trainline power status. Specifically, detection of zero trainline power is a signal to wake-up the Echelon transceiver. The latter type of control also provides a degree of protection in failure circumstances.

Other details, objects, and advantages of the invention will become apparent from the following detailed description and the accompanying drawings figures of certain embodiments thereof.

BRIEF DESCRIPTION OF THE DRAWING FIGURES

Figure 2:
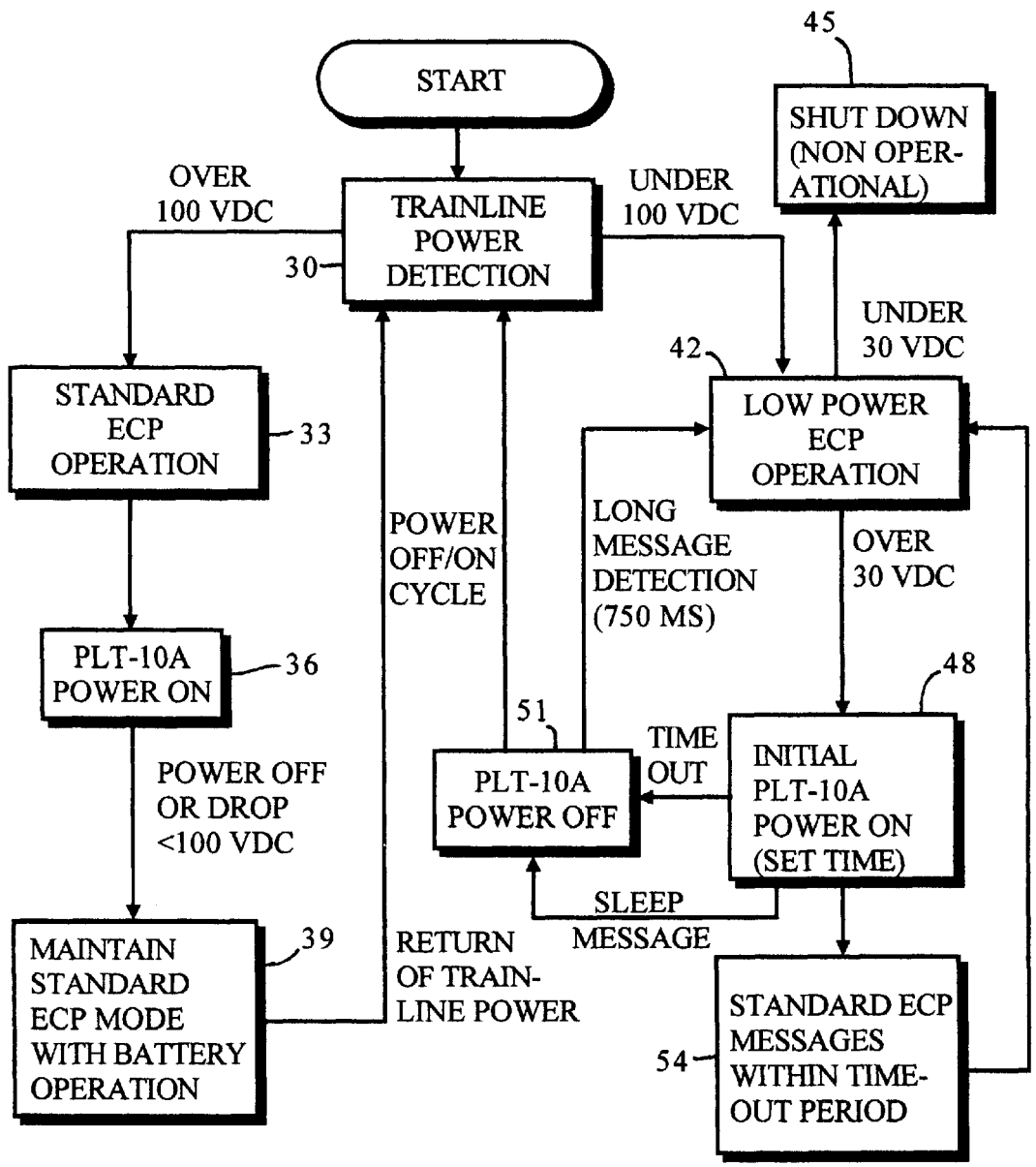

A more complete understanding of the invention can be obtained by considering the following detailed description in conjunction with the accompanying drawings, in which:

FIG. 1 is a schematic of a presently preferred configuration of components on board an ECP car; and FIG. 2 is a presently preferred embodiment of an ECP low power operation logic diagram.

DETAILED DESCRIPTION OF CERTAIN EMBODIMENTS

Referring now to the drawing figures a presently preferred presently preferred configuration of components on board an ECP car is shown in FIG. 1, including a microcontroller 5 connected to an ECP battery 8. The microcontroller 5 governs a power switch 11 for selectively supplying power to a transceiver 14. The microcontroller 5 also controls a power supply 17 for converting power, which can be supplied by an ECP trainline 20, at a desired voltage, from about 30–250 VDC, nominal. It should be understood that, while we refer to "100 VDC" or "230 VDC," these are nominal voltages, and the voltage can vary depending upon apparatus and operating conditions, including the distance of transmission in trains of varying lengths. It will also be apparent that other voltages could be satisfactorily employed. The transceiver 14 is connected to the ECP trainline 20 for sending transmissions thereby. The microcontroller 5 also oversees a filter/peak level detector 23 connected to the ECP trainline 20, which can identify that a transmission is being sent to that particular ECP car, and a trainline (T/L) voltage measurement component 26, also connected to the ECP trainline 20, for monitoring the voltage level and enabling the microcontroller 5 to determine whether sufficient voltage is available for operation in the standard, 230 VDC mode, or in the low power mode.

Since the transceiver 14, typically an Echelon transceiver, is by far the greatest source of power consumption on the ECP cars, the primary consideration is controlling the operation of the transceiver 14 to minimize the average "on-time" of that device. This involves two basic requirements: (1) provision on-board the ECP car, controlled by the locomotive or another car in the train, to normally maintain each ECP car's transceiver in "sleep" mode, but being able to "wake" it up and turn on the receiver portion and (2) system protocol design to minimize the average "on-time" of each ECP car's transceiver, while maintaining the same functionality as in the AAR ECP specifications. As described in detail below, both work in conjunction with each other in a system according to the invention to minimize power consumption.

SLEEP TO WAKE-UP CAPABILITY

The Echelon PLT-10 power line overlay signal operates on a spread spectrum carrier, with frequencies over a band of approximately 125 to 450 KHz. The ECP equipment on each car includes a filter/peak level detector 23, having a band pass filter and peak level detector portions to provide independent, and redundant, ways to identify to an individual ECP car that an Echelon transmission is being made. This detected signal can be converted by a standard analog-to-digital converter and interfaced to a very low-power microcontroller 5. Alternatively, a gate array device (not shown) may be utilized in place of the microcontroller 5. Either of these devices could also used for brake pipe pressure monitoring if desired.

If the carrier frequency is detected for a set time period, the Echelon receiver portion would be turned on and ready to receive messages in the normal manner. The threshold time for a carrier signal to result in wake-up of the Echelon would be on the order of 50 ms. This allows routine status messages, which are on the order of 20 ms in length, from each car to be transmitted without causing all cars on the train to turn on their Echelon transceivers.

The lead locomotive, or any car, can elect to turn on all cars in the train by sending a long transmission, or series of sequential transmissions, exceeding the defined threshold (over 50 ms). An additional time, on the order of 100 ms, is required for the Echelon systems to turn on and be ready to accept messages after which normal messaging can be received.

The last car of the train could preferably operate with the transceiver always on. When the "turn-on" message is received, it would reply with its own long message (over 50 ms) transmission reply. In this manner, cars at the end of the train, which would have the lowest threshold level to detect, would be given a second "wake-up" call with a stronger signal, compared to the signal received from the lead.

Another enhancement to the design would be for each car to automatically adjust the signal strength which is used to detect the "turn-on" command. This can be done by periodically checking the signal strength of the routine short messages, 20 ms, compared to the noise level. This adjustment can be software-based, as a function of the signal strength after analog-to-digital conversion. Moreover, the same circuit used for the "wake-up" function can also be used for measuring the Echelon signal strength and to establish car ordering, per AAR specifications.

Once the transceivers on the cars are turned on, a specific message can be sent to return them to "sleep mode". If there are no Echelon messages for a set period of time, nominally 2 minutes, the car systems will automatically return the Echelons to sleep mode.

SYSTEM PROTOCOL

As shown in FIG. 2, each ECP car will know which operating protocol to use based upon the trainline voltage. At start-up, the trainline 20 power is detected in block 30. If the voltage is over 100 VDC, in the 100 to 230 VDC range, the "AAR Standard" protocol will be implemented in block 33, with the Echelon receiver being powered "on" continuously as indicated in block 36. If trainline power subsequently goes off or falls below 100 VDC, standard ECP mode operation can still be maintained using the ECP battery 8, as indicated in block 39.

In the case where, at start-up, the trainline voltage is below 100 VDC, the "power savings" protocol, as described in more detail below, will be implemented as indicated by block 42. Upon initial powering of the trainline, under 100 VDC, the trainline 20 voltage is further checked to determine whether it is at least 30 VDC,. If the voltage is below 30 VDC, the ECP equipment is shut down, as indicated at block 45. However, if at least 30 VDC is detected the transceiver 14 will be turned on, at block 48, for a set period of time, nominally up to 2 minutes, waiting for a transmission, which time period is extended with transmissions received. The train test and car ordering would be per standard AAR specifications. The car order information is retained by each car, and is used to define routine status reporting time slots.

Following the completion of standard AAR train testing and car ordering procedures, the locomotive would send out three redundant messages for the "low power" mode of operation, after which each car would put the Echelon transceiver 14 into a sleep mode, as indicated in block 51. The locomotive would then initiate a "wake-up" series of messages, such as a long message, for example having a length of 750 ms, to wake up each transceiver as indicated at block 42. Each car would then be polled to insure the wake-up circuitry is functional. Subsequent to this testing, the cars would be returned to sleep mode, at block 51 for normal operations to resume. The sleep mode could be imposed by a sleep message or by a "time out," i.e. expiration of the nominal 2 minute time period with no transmissions received.

As in the over 100 VDC operation mode, the trainline 20 voltage is monitored such that if the voltage increases to over 100 VDC, as detected in block 30, the low power mode can be shifted to standard ECP mode operation in block 33, with the associated higher power limits.

In the event the "wake-up" function does not work on any of the cars, the locomotive engineer could elect to disable the power savings mode and operate with the Echelon on at all times. To accomplish this, power would be cycled to the trainline 20 and the locomotive ECP system would be commanded to not use the power savings mode. This would be acceptable for trains of shorter lengths and fewer cars, such as about 10,000 feet and 120 cars, assuming each car's ECP battery 8 is initially fully charged. In any event, the locomotive ECP system can provide advice to the engineer of the ability for the train to maintain battery 8 conditions without being in the low power mode.

Once in the "low power" mode of operation, a presently preferred communications strategy can be as follows:

1. Routine status messages, approximately 20 ms in length, are sent by unacknowledged transmissions from each car, within a defined time slot, based upon car order. For example, with a maximum train length of 160 cars, each car would turn on and send its message every 160 seconds, within the first quarter second of the assigned one-second time slot, and then return to sleep mode. The status information content would be the same as per AAR ECP specifications. The standard specification is based upon the sequential polling of each car by the locomotive head-end-unit ("HEU").
2. The last car, or end-of-train ("EOT") unit, would be allowed a higher-power budget for reporting to the HEU every second, as in the AAR specifications. The EOT would use the third quarter of the one-second time slots, with the first half of the one-second time slots being used for routine car reporting. These EOT messages would be unacknowledged from the locomotive.
3. In the event of no braking actions required, each hour the locomotive would send out a long transmission to wake up each car and issue an updated time-synchronization message, at block 48 in FIG. 2. Whenever there are braking actions requiring Echelon 14 wake-up, followed by a closing command to return to sleep mode, time-synchronization would be provided as part of the command message to return to sleep.
4. Due to the message contention scheme built into the Echelon system, the small message size and the relatively low messaging rate, even if several individual cars operated outside of their assigned time slot, the message success rate would still be relatively high.
5. The locomotive would need to miss 2 status messages before taking action to wake-up all cars, and specifically poll the missing cars. If the missing cars still did not respond, they would be declared defective and the train would return to sleep mode.
6. Braking actions would be initiated by sending out repeated messages to cover the wake-up time (nominal 50 ms) and turn-on time (additional 100 ms). The last car of the train, or the EOT unit, responds to both confirm turn-on and acknowledge the brake command message.
7. While brake cylinder pressure is being changed, up or down, the Echelon system remains powered. When there are no command changes from the locomotive for two minutes, the locomotive would send a "return to sleep mode" command.
8. Even if the cars are in the Echelon power-on mode, any brake commands would operate the same as if the cars were in the sleep mode, i.e. long messages with repeats.
9. While in power-on mode, the routine car status reporting would revert to the standard AAR defined polling scheme, replacing the low-power automatic reporting in assigned time slots.
10. Additionally, distributed power control ("DPC") of remote locomotives could still be accomplished via the ECP trainline while in low-power mode. The same time-slotting method would be used, with short messaging. The second and fourth quarters of each one-second time slot would be reserved for DPC. The message lengths would be shorter than the 50 ms needed to wake up the cars.

A low power ECP trainline communication system as described above can provide several advantages. For example, the average power use of the Echelon transceiver 14 (PLT-10A and Neuron chip) when operating continuously on, as in the standard AAR protocol, is approximately 320 mW. In comparison, in the described low power system, assuming an average of 2 braking actions (apply and release cycles) per hour, the average power consumption reduces to under 100 mW. Of this, approximately 50 mW is consumed by the Echelon transceiver 14 and the other roughly 50 mW is used by the signal level detection circuit 23.

Generally, according to the invention, such a low power system can provide functionally equivalent ECP operation while utilizing a 74 VDC trainline 20 instead of the 230 VDC trainline as in AAR specifications. However, this requires the average power consumption per car to be under 1 W, with closer to 0.5 W desirable to allow margins for charging batteries, as well as future car monitoring options. If the Echelon transceiver 14 needed to be on full time, there would be little or no margin to operate reliably with 160 cars, especially in low-temperature conditions where more energy is needed to maintain the ECP battery 8 charge. In addition, there would be insufficient energy budget left for growth of other car monitoring functions which may be desired. The net result is that it is unlikely there would be sufficient power budget margin to allow use of 74 VDC powered ECP systems on a routine basis if the Echelon transceiver 14 had to be powered full time.

There are several advantages to being able to operate ECP trains on nominal 74 VDC trainline 20 as compared to the 230 VDC trainline 20 specified under the AAR standard. Some examples are listed below, but the list is not intended to be exclusive.

1. Elimination of the need for equipping 74 to 230 VDC power supplies on the locomotives.
2. Lower levels of personnel hazard related to car coupling and uncoupling, as well as maintenance.
3. Potential for elimination of the need to equip a separate ECP trainline 20 on locomotives, thus supporting the ability to operate ECP trains without any modifications to trailing unit locomotives. This also supports development of portable locomotive units with a minimum of locomotive cabling.

The third point, related to elimination of a separate trainline for locomotives, is made easier by going to a 74 VDC operation system, but also requires other devices not specifically covered by this disclosure. In this regard however, commonly owned copending U.S. patent application Ser. No. 09/224,541, titled "Railway Locomotive ECP trainline Control," previously incorporated herein by reference, describes an apparatus for interfacing a standard locomotive MU cable to the ECP trainline wire so that only the lead locomotive in a multiple locomotive train would need to be ECP equipped. ECP command signals from the lead locomotive would be transmitted through the non-ECP locomotives via a locomotive MU cable to the ECP trainline wire. This could be achieved, as disclosed in the aforementioned incorporated patent application, by providing an adapter to interface the ECP trainline wire and the locomotive MU cable.

Preferably in addition to the protocol described above, the system can also utilize control over the ECP trainline power to communicate with the ECP cars. This can also add a degree of fail-safe protection to the normal operating system protocol.

All ECP trainline type systems must have a provision enabling the Master Controller ("MC"), typically part of the locomotive HEU, to turn the ECP trainline 20 power on and off. This is required because the power must be turned off whenever the cars are connected or disconnected from the train. The power is turned off for both safety reasons and also to prevent damage to the connectors. According to the invention, standard hardware that is already in place is utilized by the MC to signal the ECP system on each car to turn its Echelon receiver 14 "on." The ECP system on each car will include an apparatus, or circuit, such as, for example the T/L voltage measurement component 26 shown in FIG. 2, to detect a trainline 20 power "off" condition. Whenever the MC wants to turn all the Echelon transceivers 14 "on," it will turn the trainline 20 power "off" for a prescribed minimum amount of time, typically 50 ms, and then turn it back on. Since the car ECP electronics have battery 8 power back-up, the 50 ms of power interruption is inconsequential. The fact that the Echelon transceivers 14 automatically come "on" when a trainline 14 power off condition is detected, as opposed to when the power comes back on, is neither capricious nor insignificant. Rather, it is by design, as will be described in more detail below. After the transceivers 14 are powered on, the MC is in control and will command the appropriate action which could be a brake command or a power off command.

In this scheme, each car will periodically report its status to the MC. After each car's transceiver 14, typically the Echelon, has been powered on, the MC will poll each car in sequence. The particular sequence is determined by the MC. This polling command will tell the car to zero or synchronize its clock and it will also tell that particular car the number of seconds after which that particular car is to turn its receiver "on" for a subsequent periodic MC poll. After this poll the car will turn its Echelon transceiver 14 "off" until the number of seconds commanded by the MC have elapsed, at which time the car will turn its transceiver 14 "on" and await the MC poll.

On a typical 160 car train, this method will result in each car's transceiver 14 being powered for approximately one second out of every 160 seconds, assuming that the MC polls at the rate of one car per second, as in the AAR specifications. Consequently, there is a power savings of 1/160, which is a very significant reduction. Also, the MC is always in complete control.

Fail safe considerations are also a vital part of any operating system. The existing conventional AAR ECP trainline system employs periodic (every one second) polling messages from the MC to the EOT and from the EOT to the MC to check the integrity of the communications network. If three consecutive messages are missed by either device, the operational device assumes that there is something wrong and initiates the appropriate actions. Since in the proposed ECP low power system the functionality of both the EOT and the MC are not affected, the above described method of checking for the network's integrity can still be employed without any degradation.

The existing AAR ECP trainline system also requires that each car monitor the periodic (once every second) MC messages and that each car take appropriate action if three consecutive messages are missed. In the low power ECP system described, the car communication transceivers 14 are normally turned off, thus the above requirement cannot be met, at least not in the same manner as in conventional AAR ECP systems. However, according to the invention, certain other fail safe provisions can be made for each car to take appropriate action in possible failure circumstances such as where MC messages for some reason cannot be received by a car. As described in detail below, the following fail safe provisions are generally equivalent, in effect, to the fail safe provisions intended to be provided by the AAR specification that each car monitor the MC messages and take appropriate action if three messages are missed.

There are basically three failure cases that can eliminate the MC's ability to wake up, or turn "on," a car's Echelon: (1) a trainline power controller failure; (2) failure of the MC; and (3) a break-in-two, or break-in-more-than-two, condition. Each case, along with the manner in which each case is dealt with, is described below.

In the case of a trainline power controller failure, it is assumed that the trainline Power controller can fail in the "power on" condition. Two complementary provisions can be employed to overcome this problem: (1) the trainline power controller can be designed such that its fail safe mode of failure is with the trainline power off; and (2) the EOT can have the ability to short the trainline, thus forcing a power off condition. These two provisions give redundant and independent ways of achieving the desired result.

In the second case, a failure of the MC, it is assumed that the trainline power could be either on or off, depending on the nature of the MC failure. Two complementary provisions can also be used to handle this problem: (1) the design of the MC and the communications link between the MC and the trainline power controller can be such that failure of the MC will result in the trainline power being turned off; and (2) the EOT can have the ability to short the trainline. Like the first case, these provisions also give redundant and independent ways of achieving the desired result.

The last case, a break-in-two, or more, will result in the car transceiver 14 being powered "on." This is so because, by design, the signal to turn the car transceiver 14 "on" is the trainline power "off" condition. Thus, any brake in two, or any other trainline 20 problem such as either a trainline 20 short circuit or a connector failure, will necessarily result in the desired outcome—namely, the transceiver 14 being turned "on."

The low power communication system according to the invention should also function in a 74 VDC ECP emulation mode of operation. The low power ECP emulation mode is different from the previously described ECP low power communication mode of operation in that in the ECP emulation mode there are no ECP brake commands. Instead, the brake command is pneumatic and is derived by the car ECP system from the brake pipe pressure level. Thus, most of the above described low power communication mode is still applicable to a 74 VDC low power ECP emulation mode, assuming a certain minimum set of hardware.

Such minimum hardware could, for example, be a 74 VDC power controller and an Echelon node to an MU-to-trainline Box. This level of functionality would be relatively simple and inexpensive to add, and would probably be necessary anyway to achieve the desired level of system integrity. With this functionality, the system could operate in similar fashion to the regular ECP mode wherein brake commands are electrically communicated to each car via the ECP trainline 20. Either the EOT or the MU Box would take on the MC function and would be in constant communication (once every second) with each other, thus insuring network integrity. Each car would be polled sequentially as described previously. This minimum hardware would also allow for the implementation of a trainline power off feature. That is, giving the operator the ability to turn the trainline 20 power off, such as by a push button switch, from either the EOT or the MU Box. This may be a necessary feature anyway as the cars would need to be either connected (added) or disconnected (subtracted) while in the 74 VDC ECP emulation mode.

Either the EOT or the MU Box, or both, could provide for communications with the operator, i.e. engineer, via the locomotive EOT LCU. Of course, if the MU Box is to be used for this purpose the appropriate radio transceiver would have to be added.

The main advantages of MU Box to LCU communications is that because of the MU Box proximity, this would be a very robust communications link, which is a significant benefit in this type of system.

Taking the system even further towards full ECP functionality, full MC functionality could be added along with an additional Echelon node to the MU Box. This would allow the MU Box to communicate with a simple locomotive device that could generate the brake command. This locomotive device could be part of a locomotive EOT LCU, or it could be an independent device. Alternatively, this functionality could be part of the Locomotive Electronic Brake, such as the "EPIC" system. In effect, this would then make up essentially a full ECP system.

Finally, although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A communication method for an ECP freight train brake system having a ECP trainline wire, a locomotive with a head-end-unit including a master controller, a plurality of ECP freight cars each including a transceiver for communicating with at least one of said master controller and transceivers other ECP freight cars via the ECP trainline, said method comprising:

a. placing said transceiver in a sleep mode during normal train operations;

b. detecting messages sent via said ECP trainline;

c. periodically waking at least a receiver portion of said transceiver to at least receive messages sent via said ECP trainline;

d. returning said transceiver to said sleep mode after receiving said messages;

e. waking up said transceiver responsive to a wake up command sent via said ECP trainline; and f. returning said transceiver to said sleep mode after said wake up command.

2. The method of claim 1 wherein said periodically waking in step (c) further comprises waking a transmitter portion of said transceiver to respond to said messages with car status messages.

3. The method of claim 2 further comprises waking up said transceiver in step (e) responsive to a wake up command issued by said master controller.

4. The method of claim 1 further comprising maintaining in an "on" state said transceiver of a last-in-line one of said plurality of ECP freight cars.

5. The method of claim 4 further comprising waking up said transceiver in step (e) responsive to a wake up command issued by said transceiver of said last-in-line ECP freight car.

6. The method of claim 1 further comprising returning said transceiver to said sleep mode in step (f) responsive to a sleep command from at least said master controller.

7. The method of claim 1 wherein said returning said transceiver to said sleep mode in at least one of steps (d) and (f) further comprises said transceiver being returned to said sleep mode responsive to the passage of a predetermined amount of time during which no message is detected.

8. The method of claim 2 wherein said messages and said car status messages each have a first message length on the order of about 20 ms in length and further comprising:

a. determining a length of messages detected;

b. maintaining said transceiver in said sleep mode responsive to messages corresponding to said first length; and c. waking up said transceiver responsive to messages having a second length greater than said first length.

9. The method of claim 8 wherein said second length is on the order of about 50 ms.

10. The method of claim 2 wherein waking up said transceiver in step (e) further comprises:

a. determining a message signal strength of detected messages;

b. comparing said message signal strength to a predetermined signal strength indicative of a wake up command; and c. waking up said transceiver responsive to said message signal strength corresponding to said predetermined signal strength.

11. The method of claim 10 wherein said messages and said car status messages have a second signal strength and farther comprising:

a. periodically comparing said second signal strength to a noise level in said ECP trainline over which such messages are transmitted;

b. determining a signal strength adjustment factor; and c. adjusting said predetermined signal strength by said signal strength adjustment factor to account for said noise level.

12. The method of claim 1 further comprising:

a. detecting a prevailing voltage in said ECP trainline; and b. waking up said transceiver responsive to detecting zero voltage in said ECP trainline.

13. The method of claim 1 wherein said periodically waking in step (c) is implemented at predetermined time intervals initially communicated to said transceiver by at least said master controller during a train start-up procedure.

14. The method of claim 1 further comprising:
a. initially waking said transceiver on each of said plurality of ECP cars during a train start-up procedure via a wake up command issued by said master controller via said ECP trainline;
b. communicating to said transceiver on each of said plurality of ECP cars an assigned time slot for periodic transmission of car status messages to said master controller;
c. periodically transmitting said car status message from said transceiver on each of said plurality of ECP cars to said master controller in said assigned time slot; and
d. returning said transceiver on each of said plurality of ECP cars to said sleep mode after said car status message is periodically transmitted to said master controller.

15. The method of claim 14 wherein a last-in-line of said plurality of ECP cars transmits said car status message once every second.

16. The method of claim 14 wherein said car status messages are unacknowledged by at least said master controller.

17. The method of claim 14 wherein said assigned time slot is a one second time slot based upon car order as determined by said master controller sequentially polling each of said plurality of ECP cars.

18. The method of claim 17 wherein said assigned time slot is a one second time slot and said transceiver transmits said car status message within a first quarter second of said one second time slot.

19. The method of claim 14 wherein the freight train includes an end-of-train unit and further comprising:
a. said end-of-train unit transmitting status messages to said master controller once every second;
b. transmitting said status messages during a third quarter of each said second; and
c. reserving a first half of said second for said car status messages transmitted to said master controller.

20. The method of claim 19 wherein said messages from said end-of-train unit are unacknowledged by said master controller.

21. The method of claim 3 wherein no wake up commands issued by said master controller for a one hour period further comprising:
a. issuing a wake-up command to said transceiver from said master controller; and
b. issuing an updated time-synchronization message simultaneously with said wakeup command.

22. The method of claim 6 further comprising issuing an updated time-synchronization message simultaneously with said sleep command.

23. The method of claim 2 further comprising said master controller:
a. detecting said car status messages;
b. issuing a wake-up command responsive to failing to detect at least two car status messages from any of said plurality of ECP cars; and
c. individually polling each of said plurality of ECP cars for which said at least two status messages were not detected.

24. The method of claim 23 further comprising:
a. declaring the non-responding ones of said plurality of ECP cars defective; and
b. issuing a sleep command to return said trasceiver on each of said plurality of ECP cars to said sleep mode.

25. The method of claim 8 further comprising initiating braking on each of said plurality of ECP cars by issuing from at least said master controller repeated messages exceeding said second length to wake-up said transceiver.

26. The method of claim 25 wherein said second length comprises about 50 ms nominal.

27. The method of claim 25 further comprising issuing said repeated messages for an additional time period beyond said second length to accommodate a turn-on time of said transceivers.

28. The method of claim 27 wherein said additional time period comprises about 100 ms nominal.

29. The method of claim 25 further comprising issuing from said transceiver on a last-in-line one of said plurality of ECP cars a brake command acknowledgment message to said master controller.

30. The method of claim 29 further comprising issuing from an end-of-train unit a brake command acknowledgment message to said master controller.

31. The method of claim 1 further comprising maintaining said transceiver in an "on" state during alterations in brake cylinder pressure on said plurality of ECP cars.

32. The method of claim 14 wherein all transceivers are in a wake mode further comprising implementing car status reporting at the standard AAR defined polling scheme in place of communicating in said assigned time slots.

* * * * *